May 28, 1957   H. J. ALBRITTON   2,793,881
BALL AND SOCKET TYPE TRAILER HITCH
Filed Sept. 1, 1954
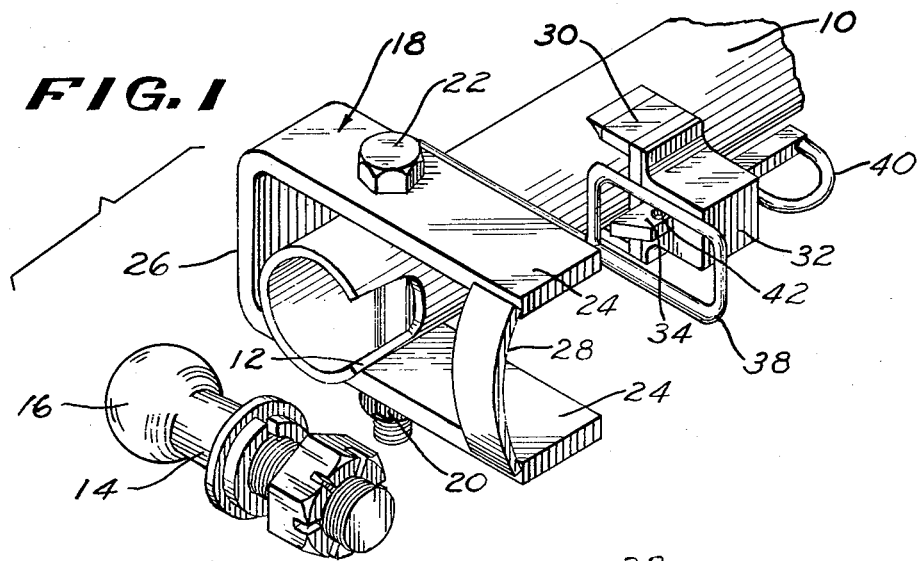
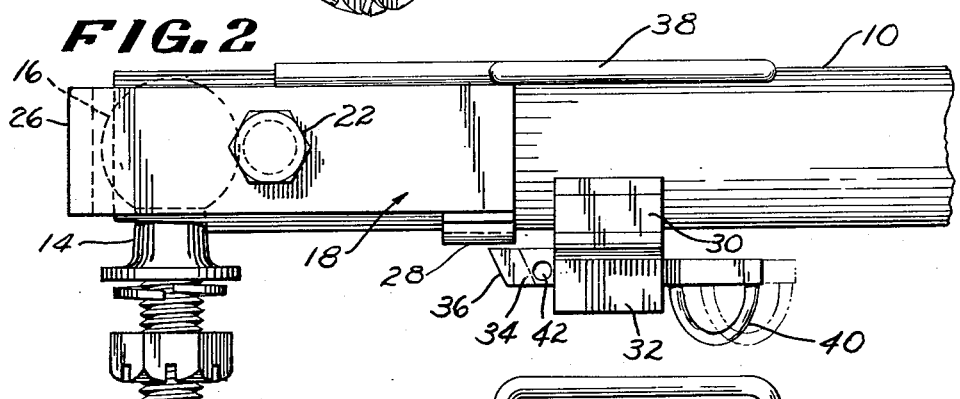
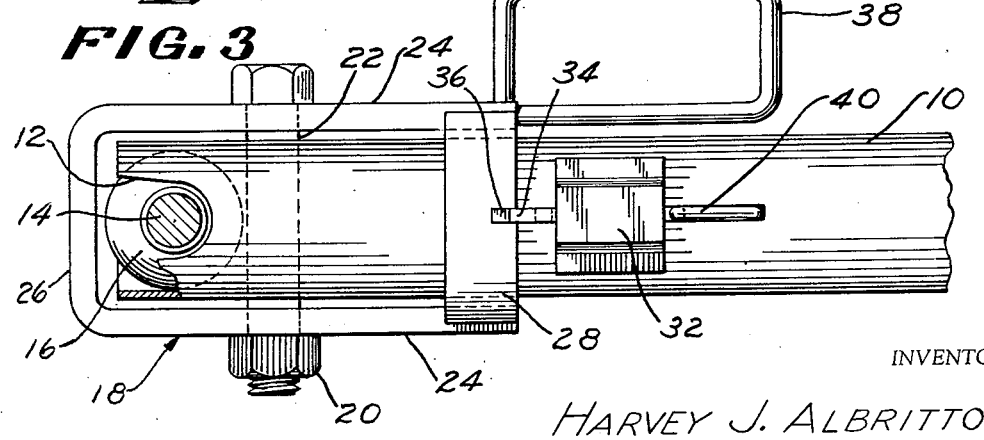
INVENTOR
HARVEY J. ALBRITTON
BY Cushman, Darby & Cushman
ATTORNEY

United States Patent Office 2,793,881
Patented May 28, 1957

2,793,881

BALL AND SOCKET TYPE TRAILER HITCH

Harvey J. Albritton, Miami, Fla.

Application September 1, 1954, Serial No. 453,574

2 Claims. (Cl. 280—512)

This invention relates to a hitch means for connecting a boat or luggage trailer with a draft vehicle, for example an automobile.

More particularly, this invention relates to a luggage or boat trailer hitch which is particularly adapted for use with a motor vehicle having a spherical tow-ball such as is ordinarily used in connection with the conventional ball and socket hitch assemblies.

It is an object of this invention to provide a safe, durable and easily operated trailer hitch which may be fabricated in large numbers at a low cost.

It is a further object of this invention to provide a trailer hitch which is readily adapted for use with a conventional spherical tow-ball such as is widely used in connection with trailer hitches now known.

It is a further object of this invention to provide a trailer hitch which is provided with means for facilitating the coupling, or uncoupling, of the hitch without soiling the hands of the operator.

It is a further object of this invention to provide a trailer hitch which incorporates means for holding hte operative parts of the hitch off of the ground when the tow-bar is disengaged and allowed to drop to the ground, thereby protecting these operative parts from fouling by dirt, mud, grit or other harmful substances.

These and other objects of my invention will be fully understood from the following detailed description of a typical preferred form and application of the invention, throughout which description reference is made to the accompanying drawings in which:

Figure 1 is a perspective view of an improved trailer hitch embodying this invention and shown disposed adjacent, and in line with, a conventional tow-ball, for operative reception thereof;

Figure 2 is a side elevational view of the trailer hitch operatively connected to the tow-ball; and Figure 3 is a bottom plan view of the hitch shown in Figure 2, with parts broken away to illustrate details.

Referring to Figure 1, a tube 10 constitutes the free end of a trailer tow-bar. If desired the tube 10 can constitute the entire tow-bar or can be merely an extension thereof. The tube 10 is here illustrated as being cylindrical but it is entirely within the contemplation of this invention that it may be formed with various cross-sections, such as square, rectangular, or elliptical. The free end of the tube 10 is open and is provided with a longitudinal slot 12 formed in the lower portion of its wall and extending inwardly from the open end of the tube. This slot 12 extends inwardly from the free end for a substantial distance and has a width somewhat greater than the diameter of the neck 14 of a tow ball 16, but considerably less than the diameter of the ball itself.

A U-shaped strap stirrup 18 straddles the tube 10 and is connected thereto for pivotal movement in a vertical plane by a pivot bolt 22, which extends transversely through the legs 24 of the stirrup and has a nut 20 threaded thereon. The stirrup is so dimensioned that when it is rotated about the bolt 22 until its longitudinal axis is parallel with the axis of the tube 10, its base 26 will be disposed but a short distance beyond the open end of the tube 12, as best shown in Figure 3, and will substantially close the latter. When the base 26 is so located, the stirrup 18 will be deemed hereinafter to be in a closed position.

The free ends of the stirrup legs 24 are joined by a saddle 28 which extends beneath the tube 10 in the closed position of the hitch. The saddle 28 is arcuately shaped to at least roughly conform with the curvature or configuration of the under-side of the tube 10, upon which it will bear when the stirrup 18 is rotated to its closed position. It will, therefore, be seen that the saddle 28 constitutes a limiting means which prevents the stirrup 18 from rotating beyond a certain point, that is, the closed position.

Depending from the under surface of the tube 10 is a lug 30 which may be welded, bolted, or otherwise suitably fixed thereto and which carries a latch housing 32 which contains a spring (not shown) or other means, for resiliently urging a latch bar 34 toward the free end of the tube 10, that is, to its operative position. The free end of the latch 34 is formed with an oblique surface 36, the tip portion of which extends beyond the arc generated by the saddle 28 when the stirrup 18 is rotated about tube 10 on bolt 22.

One leg 24 of the stirrup is provided with a handle 38 which may be fixed thereto by welding, by bolts, or by other suitable means. The handle 38 extends beyond the free end of the leg 24 for a sufficient distance to serve as a ground engaging element as will be discussed hereinafter. The latch bar 34 is provided with a finger ring 40, adjacent the rear end thereof, which provides a convenient gripping surface for withdrawing the keeper from its operative position as, for example, when it is necessary to uncouple the hitch, as will be discussed hereinafter. The latch bar also has a transversely extending hole 42 therein. This hole is located exteriorly of, but closely adjacent, the latch housing 32 when the latch bar is in its extended or operative position. This hole 42 may be of a suitable size to receive a padlock (not shown) which may be secured to the latch bar 34 to prevent unauthorized tampering with, or release of, the coupled hitch.

The hitching device is operated as follows:

The trailer tow-bar carrying, or forming a part of the tube 10, is manipulated into alignment with the tow-ball 16 which is fastened by its neck 14 to a draft vehicle (not shown). The tube 10 is then moved toward the tow-ball 16, or vice versa, until the tow-ball 16 is disposed within the tube with the neck 14 disposed within, and extending through, the slot 12.

The handle 38, as viewed in Figures 1 and 2, is then lifted to rotate the stirrup 18 in a counterclockwise direction, thus bringing base 26 into a position covering the open end of the tube 10 and thus completing the enclosure of the tow-ball 16.

As the stirrup is so rotated, it will be seen that the saddle 28 will be brought to bear against the inclined surface 36 of the latch bar 34 and will move the latter against the resilience of the spring (not shown) within latch housing 32. When, however, the saddle 28 clears the tip of the oblique surface 36, the latch bar 34 will snap back into its extended operative position in which it acts as a positive detent or lock, as best shown in Figure 2.

Referring more particularly to Figures 2 and 3, when the stirrup is in its closed position, the tow-ball is effectively retained by the hitch. It cannot be displaced forwardly because of the base 26 of the stirrup 18; it cannot be displaced laterally because of the side walls of the tube 10; and its movement to the rear is limited by the end of the slot 12, which will bear against the neck 14.

Disengagement of the hitch may be easily effected by pulling ring 40 to withdraw the latch bar 34, against the resilient pressure of the spring (not shown), and by simultaneously applying a downward force to the handle 38. This force will serve to rotate the stirrup 18 in a clockwise direction, as viewed in Figures 1 and 2, and will thus raise the base 26 clear of the open end of the tube 10, thereby permitting the ready withdrawal of the tow-ball 16 from the tube.

When the hitch is not in use, that is to say when it is not serving to engage a tow-ball, the stirrup 18 may be maintained in its open position with the handle 38 depending therefrom to serve as a ground engaging element which will hold the moving parts off the ground and clear of dirt, mud and other fouling substances when the tow-bar is allowed to drop to the ground.

Having described only a typical preferred form and application of my invention, I do not wish to be limited or restricted to specific details herein set forth but wish to reserve to myself any variations or modifications that may appear to those skilled in the art and falling within the scope of the following claims.

I claim:

1. A trailer hitch for connecting a trailer to a vehicle having a tow-ball provided with a neck fixed thereto comprising: a hollow tube having an open end adapted to receive a tow-ball, said open end of said tube having a longitudinally extending slot on its lower side for reception of the neck of the ball; a U-shaped stirrup straddling said tube and pivoted thereto at a distance from said open end for movement in a vertical plane between a ball retaining position wherein the base of said stirrup covers said open end of said tube and a position wherein said base uncovers said open end; a saddle connecting the legs of said stirrup between the free ends of said stirrup and the point where said stirrup is pivoted to said tube and engageable with the lower side of said tube in said retaining position of said stirrup; and latch means associated with said saddle for retaining said stirrup in said retaining position.

2. A trailer hitch for connecting a trailer to a vehicle having a tow-ball provided with a neck fixed thereto comprising: a hollow tube having an open end adapted to receive a tow-ball, said open end of said tube having a longitudinally extending slot on its lower side for reception of the neck of the ball; a U-shaped stirrup straddling said tube and pivoted thereto at a distance from said open end for movement in a vertical plane between a ball retaining position wherein the base of said stirrup covers said open end of said tube and a position where said base uncovers said open end; a saddle connecting the legs of said stirrup and engageable with the lower side of said tube in said retaining position of said stirrup; latch means associated with said saddle for retaining said stirrup in said retaining position, and handle means fixed to one of said stirrup legs for pivoting said stirrup between the said positions, said handle extending longitudinally of said stirrup for engagement with the ground in said uncovering position of said stirrup to maintain said tube off the ground.

References Cited in the file of this patent

UNITED STATES PATENTS 2,475,878     Clark et al.             July 12, 1949

FOREIGN PATENTS 460,462     Great Britain            Jan. 28, 1937